US012633510B2

(12) United States Patent
Matsushita

(10) Patent No.: US 12,633,510 B2
(45) Date of Patent: May 19, 2026

(54) MASS SPECTROMETER

(71) Applicant: SHIMADZU CORPORATION, Kyoto (JP)

(72) Inventor: Tomoyoshi Matsushita, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 348 days.

(21) Appl. No.: 18/292,897

(22) PCT Filed: Mar. 15, 2022

(86) PCT No.: PCT/JP2022/011509
§ 371 (c)(1),
(2) Date: Jan. 27, 2024

(87) PCT Pub. No.: WO2023/007820
PCT Pub. Date: Feb. 2, 2023

(65) Prior Publication Data

US 2024/0363324 A1 Oct. 31, 2024

(30) Foreign Application Priority Data

Jul. 30, 2021 (JP) ................................ 2021-125039

(51) Int. Cl.
*H01J 49/10* (2006.01)
*H01J 49/04* (2006.01)

(52) U.S. Cl.
CPC ........ *H01J 49/105* (2013.01); *H01J 49/0422* (2013.01)

(58) Field of Classification Search
CPC ....... H01J 49/105; H01J 49/0422; H01J 49/24
See application file for complete search history.

(56) References Cited

U.S. PATENT DOCUMENTS 9,171,704 B2 * 10/2015 Morokuma ......... H01J 49/0031
9,945,761 B2 * 4/2018 Celio ....................... G01N 1/28
(Continued)

FOREIGN PATENT DOCUMENTS

EP 4379769 A1 * 6/2024 .......... H01J 49/0422
JP H01219367 A 9/1989
(Continued)

OTHER PUBLICATIONS

Written Opinion issued for corresponding PCT application No. PCT/JP2022/011509 dated May 24, 2022.
(Continued)

*Primary Examiner* — David A Vanore
(74) *Attorney, Agent, or Firm* — Renner, Otto, Boisselle & Sklar, LLP

(57) ABSTRACT

A mass spectrometer includes: a roughing vacuum pump; a turbomolecular pump; a first chamber from which a gas is discharged by the roughing vacuum pump; a second chamber into which hydrogen gas is introduced, the second chamber being located at a stage subsequent to the first chamber; a third chamber provided with a detector, the third chamber being located at a stage subsequent to the second chamber; a gas-discharge tube that forms a gas-discharge flow from the first chamber to the roughing vacuum pump; and a gas-discharge tube that forms a gas-discharge flow from each of the second chamber and the third chamber to the gas-discharge tube by the turbomolecular pump. The mass spectrometer introduces, into the gas-discharge tube, an additional gas having a molecular weight higher than a molecular weight of the hydrogen gas.

4 Claims, 4 Drawing Sheets

(56) References Cited

U.S. PATENT DOCUMENTS

| | | | | |
|---|---|---|---|---|
| 10,290,482 | B1 * | 5/2019 | Yamada | H01J 49/067 |
| 10,361,075 | B2 * | 7/2019 | Chapon | H01J 49/24 |
| 2010/0176294 | A1 * | 7/2010 | Henry | H01J 49/24<br>250/289 |
| 2013/0175442 | A1 * | 7/2013 | Yamada | H01J 49/105<br>250/288 |
| 2018/0308672 | A1 * | 10/2018 | Gordon | H01J 49/24 |
| 2019/0287776 | A1 * | 9/2019 | Yamada | H01J 49/0072 |
| 2019/0360981 | A1 * | 11/2019 | Verenchikov | H01J 49/061 |
| 2019/0383294 | A1 * | 12/2019 | Makarov | F04D 19/046 |
| 2020/0135443 | A1 * | 4/2020 | Itagaki | H01J 49/0036 |
| 2022/0084807 | A1 * | 3/2022 | Sakagoshi | H01J 49/4225 |
| 2024/0145225 | A1 * | 5/2024 | Matsushita | H01J 49/0045 |
| 2024/0239653 | A1 * | 7/2024 | Wehe | C01B 3/28 |
| 2024/0355608 | A1 * | 10/2024 | Hauschild | G01N 30/72 |
| 2024/0363324 | A1 * | 10/2024 | Matsushita | H01J 49/105 |
| 2025/0308877 | A1 * | 10/2025 | Alavi | H01J 49/0095 |

FOREIGN PATENT DOCUMENTS

| | | | | | |
|---|---|---|---|---|---|
| JP | 5452839 | B2 | | 4/2008 | |
| JP | 2008095504 | A | * | 4/2008 | H01J 49/24 |
| WO | WO-9313241 | A1 | * | 7/1993 | C23C 16/45521 |
| WO | WO-2011106768 | A1 | * | 9/2011 | H01J 49/24 |
| WO | WO-2023089852 | A1 | * | 5/2023 | H01J 49/0481 |
| WO | WO-2023203386 | A2 | * | 10/2023 | H05H 1/30 |

OTHER PUBLICATIONS

Extended European Search Report corresponding to European Application 22848904.3 mailed Jul. 25, 2025.

* cited by examiner

MASS SPECTROMETER

TECHNICAL FIELD

The present disclosure relates to a mass spectrometer.

BACKGROUND ART

Generally, in a mass spectrometer, a sample is guided into a plasma of an ion source and is accordingly ionized, and the ionized sample is introduced into a third chamber through a first chamber and a second chamber, the first chamber including a sampling cone and a skimmer cone, the second chamber including a collision cell, the third chamber including a mass spectrometry unit. The first chamber is vacuumed mainly by a roughing vacuum pump, and each of the second chamber and the third chamber is vacuumed by a turbomolecular pump.

It has been known that a reaction gas having a small molecular weight is introduced into the collision cell disposed in the second chamber in order to remove interfering ions that interfere, in terms of a mass-to-charge ratio, with a target element having entered from the ion source. As the reaction gas, a hydrogen gas including helium and the like or a hydrogen gas not including them is used.

The turbomolecular pump is a type of mechanical vacuum pump, wherein a rotor, which is a rotary body having a turbine blade composed of a metal, is rotated at a high speed to blow gas molecules away so as to discharge the gas. It has been known that due to such a structure, the turbomolecular pump is not suitable to guide, in a predetermined direction, a molecule having a small mass and a large motion velocity, thus resulting in decreased gas-discharge performance of the turbomolecular pump when a hydrogen gas having a small molecular weight is discharged.

PTL 1 discloses a technology in which when a large amount of hydrogen gas is introduced, an additional gas is introduced from a position closer to the gas-discharge side end of the turbomolecular pump in order to reduce a partial pressure of the hydrogen gas at the gas-discharge side end of the turbomolecular pump.

CITATION LIST

Patent Literature

PTL 1: Japanese Patent No. 5452839

SUMMARY OF INVENTION

Technical Problem

In the technology disclosed in PTL 1, since the additional gas is directly introduced into the turbomolecular pump, only a flow amount of the additional gas equal to or smaller than an amount of gas discharged by the turbomolecular pump can be introduced. Further, in the technology disclosed in PTL 1, the additional gas acts to suppress the rotational movement of the rotor of the turbomolecular pump, with the result that the gas-discharge performance for hydrogen gas cannot be further improved.

The present disclosure has been made to solve such a problem and has an object to provide a mass spectrometer to improve gas-discharge performance for hydrogen gas.

Solution to Problem

The present disclosure relates to a mass spectrometer that performs mass spectrometry by activating a plasma to ionize a sample. The mass spectrometer includes: a roughing vacuum pump; a turbomolecular pump; a first chamber from which a gas is discharged by the roughing vacuum pump; a second chamber into which hydrogen gas is introduced, the second chamber being located at a stage subsequent to the first chamber; a third chamber provided with a mass spectrometry unit, the third chamber being located at a stage subsequent to the second chamber; a first flow path that forms a gas-discharge flow from the first chamber to the roughing vacuum pump; and a second flow path that forms a gas-discharge flow from each of the second chamber and the third chamber to the first flow path by the turbomolecular pump. The mass spectrometer introduces, into the second flow path, an additional gas having a molecular weight larger than a molecular weight of the hydrogen gas.

Advantageous Effects of Invention

According to the present disclosure, it is possible to provide a mass spectrometer to improve gas-discharge performance for hydrogen gas.

DESCRIPTION OF EMBODIMENTS

Figure 1:
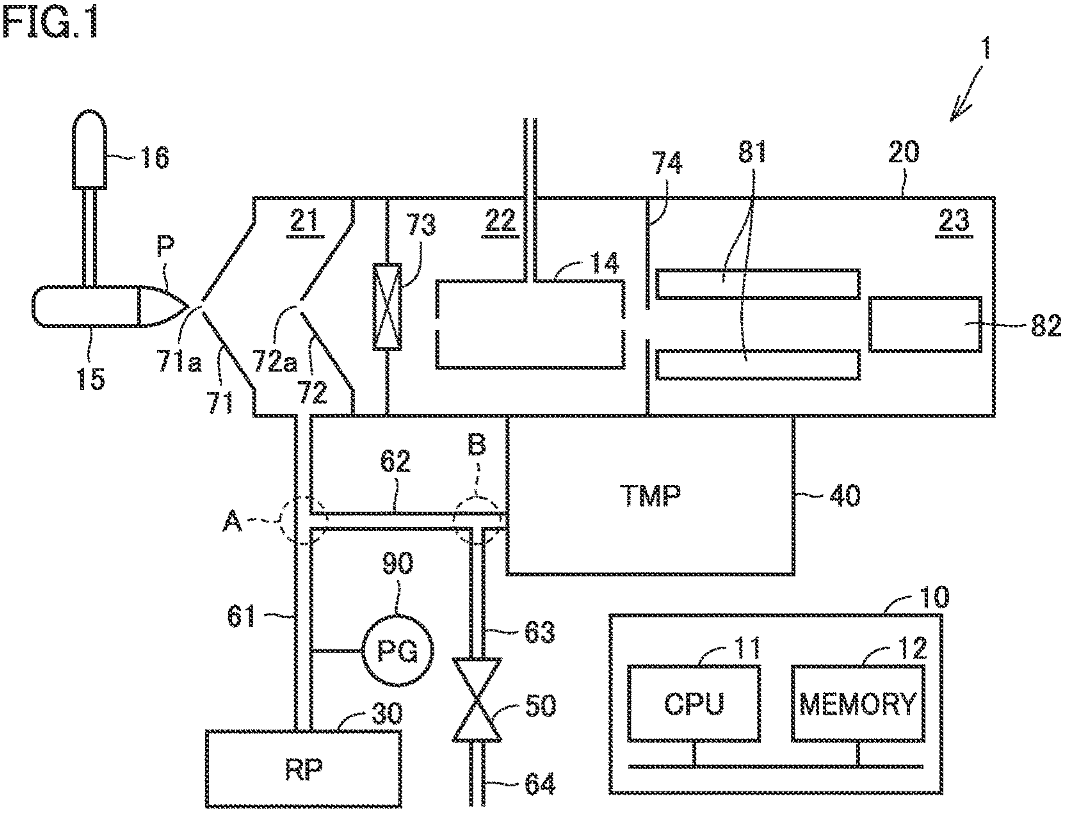
FIG. 1 is a diagram showing a schematic configuration of a mass spectrometer according to a first embodiment.

The present embodiment will be described in detail with reference to figures. should be noted that the same or corresponding portions in the figures are denoted by the same reference characters and will not be described repeatedly in principle.

First Embodiment

FIG. 1 is a diagram showing a schematic configuration of a mass spectrometer 1 according to a first embodiment. Mass spectrometer 1 includes a plasma torch 15, a main body 20, a roughing vacuum pump 30, a turbomolecular pump 40, a vacuum gauge 90, a valve 50, and a controller 10.

Plasma torch 15 ionizes the sample. Although not particularly shown, plasma torch 15 includes a sample tube, a plasma gas tube, a cooling gas tube, and a high-frequency induction coil. The plasma gas tube is connected to a gas-supply source 16 and is supplied with an argon gas or the like. With the operation of the high-frequency induction coil, a plasma P is generated in plasma torch 15.

Main body 20 has a structure partitioned from the plasma torch 15 side by a sampling cone 71 and a skimmer cone 72.

A part of plasma P generated in plasma torch 15 becomes an ion beam through sampling cone 71 and skimmer cone 72.

Main body 20 includes three chambers, i.e., a first chamber 21, a second chamber 22, and a third chamber 23, which can communicate with one another. First chamber 21 includes a space interposed between sampling cone 71 and skimmer cone 72. A part of plasma P having passed through an orifice 71*a* of sampling cone 71 enters first chamber 21. A part of plasma P passes through an orifice 72*a* of skimmer cone 72 and is further guided to a subsequent stage in the form of an ion beam. Although not shown, an ion optical component for guiding the ion beam is disposed behind skimmer cone 72.

With plasma P activated, the outside of sampling cone 71 has substantially the same pressure as the atmospheric pressure, thus resulting in a relatively high pressure in first chamber 21. First chamber 21 is configured to be reduced in pressure by roughing vacuum pump 30 through a gas-discharge tube 61 serving as a first flow path. As roughing vacuum pump 30, for example, an oil-sealed rotary pump is used.

Second chamber 22, which is separated from first chamber 21 by a gate valve 73, is provided at a stage subsequent to first chamber 21. A cell 14 is disposed in second chamber 22. From the extracted ion beam having passed through orifice 72*a* of skimmer cone 72, cell 14 removes a polyatomic molecular ion that interferes, in terms of a mass-to-charge ratio, with a target element to be detected. In cell 14, a reaction, such as a charge-transfer reaction, with a molecule of the reaction gas is performed. As the reaction gas, for example, a hydrogen gas is used. The reaction gas is introduced from an introduction port of an upper portion of cell 14. It should be noted that although not shown, cell 14 includes a multipole electrode or the like.

Third chamber 23, which is separated from second chamber 22 by a partition wall 74, is provided at a stage subsequent to second chamber 22. A separation portion for extracting an ion having a predetermined mass-to-charge ratio is provided in third chamber 23. The separation portion is constituted of multipole electrodes 81 such as quadrupoles. In third chamber 23, a detector 82 that detects an extracted ion is disposed behind multipole electrodes 81. Detector 82 functions as a mass spectrometry unit that outputs a detection signal to a signal processing device (not shown) provided outside main body 20.

Each of second chamber 22 and third chamber 23 is reduced in pressure by turbomolecular pump 40. Turbomolecular pump 40 has a plurality of rotary blades therein. The gas-discharge side of turbomolecular pump 40 extends toward roughing vacuum pump 30 via a gas-discharge tube 62 serving as a second flow path, and is coupled to gas-discharge tube 61. A position at which gas-discharge tube 61 and gas-discharge tube 62 intersect is referred to as a position A.

An additional gas is introduced into gas-discharge tube 62 via valve 50. The additional gas flows from a gas source (not shown), passes through a gas-suction tube 64, valve 50, and a gas-suction tube 63, and is introduced into gas-discharge tube 62. A position at which gas-discharge tube 62 and gas-suction tube 63 intersect is referred to as a position B.

Valve 50 functions as a valve that adjusts a flow rate of the additional gas introduced from gas-suction tube 64 to flow into gas-suction tube 63. Since gas-discharge tube 62 of turbomolecular pump 40 is reduced in pressure, when valve 50 is brought into an opened state, a certain amount of the additional gas is introduced into gas-discharge tube 62. Valve 50 may be, for example, a needle valve that can control a small flow rate.

Examples of the additional gas usable herein include: a gas having an atmospheric component with no molecule having a small molecular weight being included, such as a hydrogen gas; an argon gas; a nitrogen gas; a helium gas; and the like. As the additional gas, a mixed gas of two or more of these gases may be used. The additional gas is continuously introduced while spectrometry is performed with plasma P being activated.

Vacuum gauge 90 is connected to gas-discharge tube 61 serving as the first flow path. As vacuum gauge 90, for example, a Pirani gauge is used which utilizes such a phenomenon that an amount of heat radiated from a metal wire supplied with power and heated in vacuum is changed by a pressure to change an electric resistance.

Controller 10 includes, for example, a CPU (Central Processing Unit) 11 and a memory 12. Memory 12 is constituted of, for example, a ROM (Read Only Memory) and a RAM (Random Access Memory), and can store a control program as well as various types of data. CPU 11 executes the control program stored in memory 12 so as to control operations such as the introduction of each of the reaction gas and the additional gas.

Figure 2:
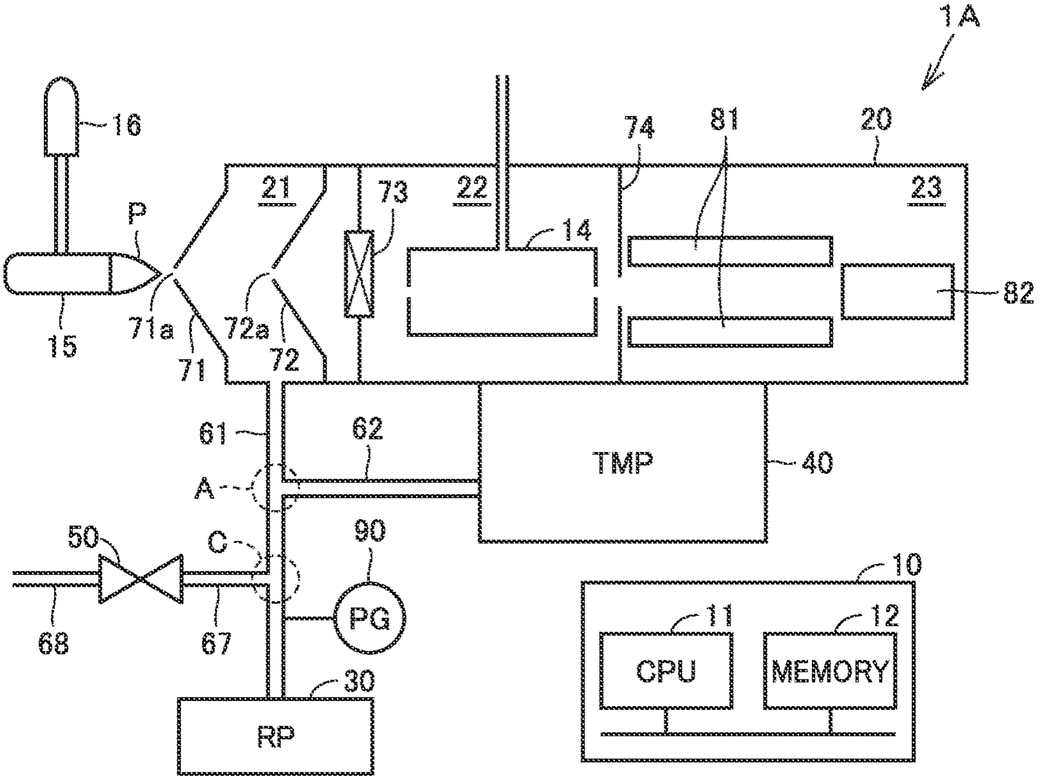
FIG. 2 is a diagram showing a schematic configuration of a mass spectrometer according to a comparative example.

FIG. 2 is a diagram showing a schematic configuration of a mass spectrometer 1A according to a comparative example. Mass spectrometer 1A of FIG. 2 is different from mass spectrometer 1 of FIG. 1 in terms of a position via which the additional gas is introduced, and the other configurations are the same. Hereinafter, in mass spectrometer 1A, the same configurations as those in mass spectrometer 1 of FIG. 1 are denoted by the same reference characters and will not be described repeatedly in detail.

As shown in FIG. 2, in mass spectrometer 1A, the additional gas is introduced from a gas source (not shown) into gas-discharge tube 61 through a gas-suction tube 68, valve 50, and a gas-suction tube 67. A position at which gas-discharge tube 61 and gas-suction tube 67 intersect is referred to as a position C.

When mass spectrometer 1 or mass spectrometer 1A is used, the reaction gas is introduced into cell 14 as required. As the reaction gas, for example, a gas including hydrogen is used. Molecules of a gas having a small molecular weight, such as the hydrogen gas, can be diffused to outside of cell 14 in second chamber 22 and can be also diffused to third chamber 23. Although each of second chamber 22 and third chamber 23 is reduced in pressure through turbomolecular pump 40, performance of turbomolecular pump 40 is limited when discharging the gas having a small molecular weight.

When the diffused gas having a small molecular weight such as the hydrogen gas is left in each of second chamber 22 and third chamber 23, the degree of vacuum is decreased, with the result that sensitivity of the spectrometry may be adversely affected due to an influence of scattering of the gas molecules. On the other hand, when the gas-discharge speed is simply increased to avoid occurrence of such a phenomenon, a large burden is imposed on turbomolecular pump 40.

In each of mass spectrometer 1 of the first embodiment and mass spectrometer 1A of the comparative example, the gas having a small molecular weight such as the hydrogen gas is discharged by slowly introducing the additional gas including no hydrogen gas or the like (hereinafter also referred to as “slow leak”). This is for the purpose of forming a viscous gas-discharge flow by mixing the additional gas with the hydrogen gas by performing the slow leak so as to cause collision of the gas molecules.

Figure 3:
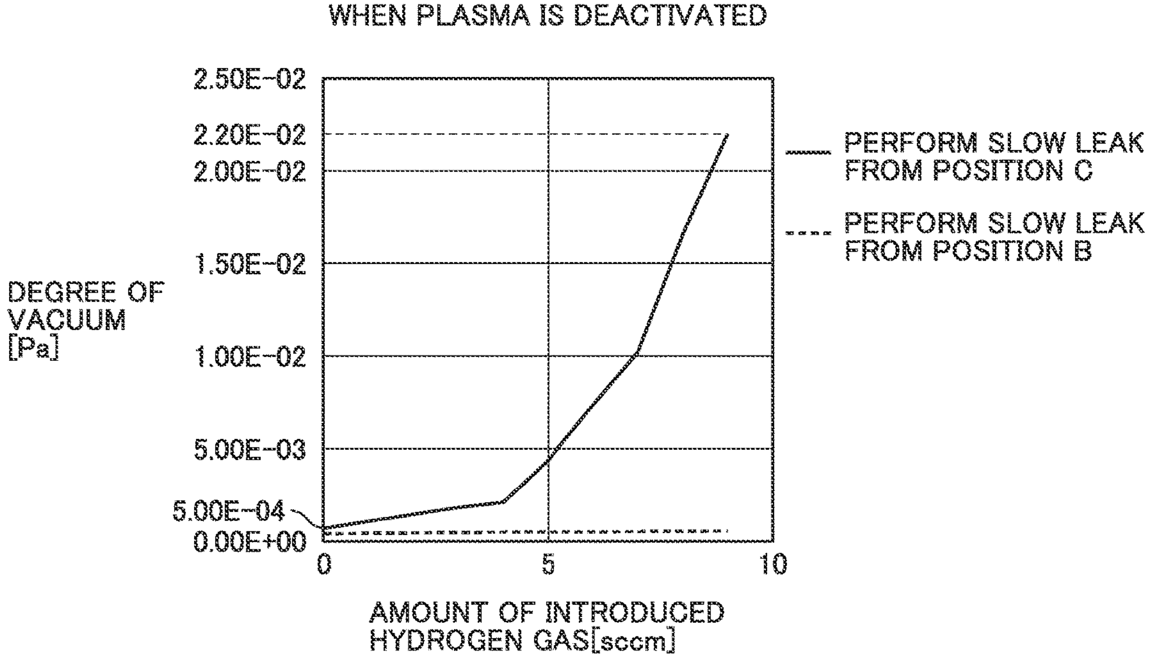
FIG. 3 is a graph showing a relation between an amount of introduced hydrogen gas and a degree of vacuum when a plasma is deactivated.

A relation between the amount of the introduced hydrogen gas and the degree of vacuum will be described. FIG. 3 is a graph showing the relation between the amount of the introduced hydrogen gas and the degree of vacuum when the plasma is deactivated, and FIG. 4 is a graph showing the relation between the amount of introduced hydrogen gas and the degree of vacuum when the plasma is activated.

Figure 4:
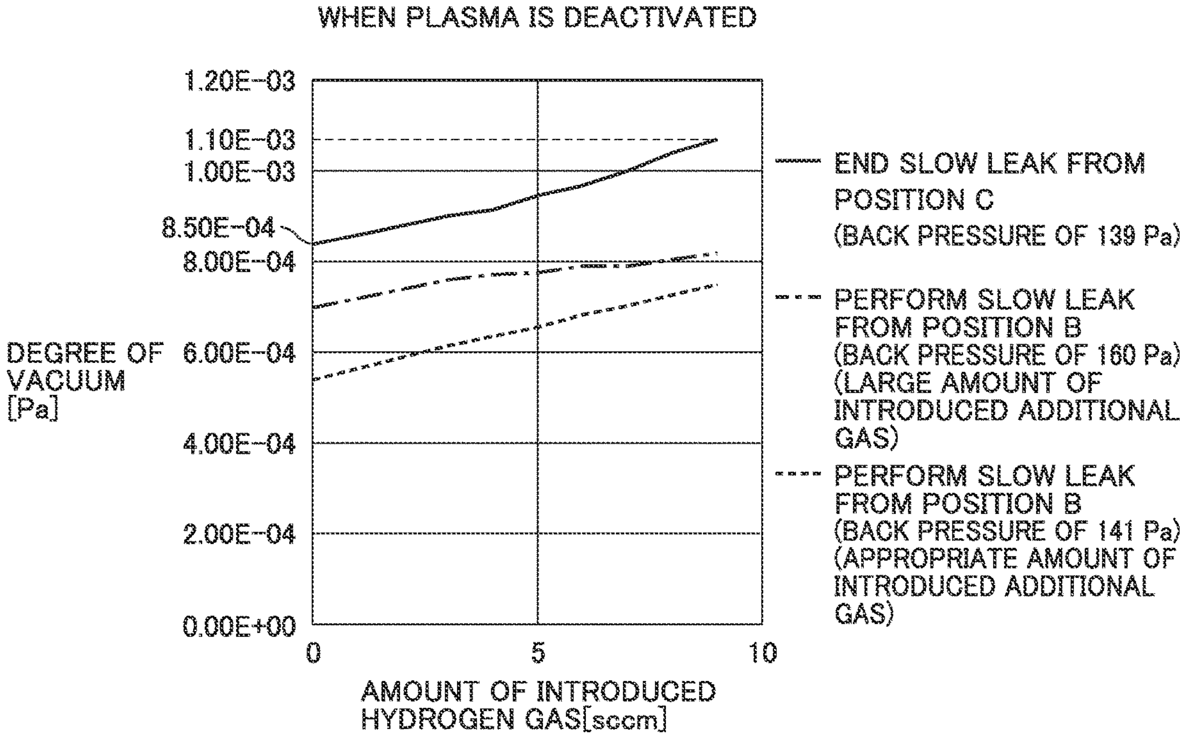
FIG. 4 is a graph showing a relation between the amount of introduced hydrogen gas and the degree of vacuum when the plasma is activated.

Each of FIGS. 3 and 4 shows the relation between the amount of the introduced hydrogen gas and the degree of vacuum when the additional gas is introduced from a position corresponding to position B in FIG. 1 or a position corresponding to position C in FIG. 2. In FIGS. 3 and 4, the horizontal axis represents the amount of the introduced hydrogen gas [sccm], and the vertical axis represents the degree of vacuum [Pa]. In FIG. 3, a solid line represents a case where the slow leak is performed from position C, and a broken line represents a case where the slow leak is performed from position B. In FIG. 4, a solid line represents a case where the slow leak from position Cis ended, a dot-dash line represents a case where the amount of the introduced additional gas is large when the slow leak is performed from position B, and a broken line represents a case where the amount of the introduced additional gas is appropriate when the slow leak is performed from position B.

As shown in FIG. 3, when the slow leak is performed from position C with the plasma being deactivated, the degree of vacuum is deteriorated from $5.00\times10^{-4}$ [Pa] to $2.20\times10^{-2}$ [Pa]. On the other hand, as shown in FIG. 3, when the slow leak is performed from position B with the plasma being deactivated, the degree of vacuum is kept higher than that when the slow leak is performed from position C. Thus, discharging of the hydrogen gas can be improved when the additional gas is introduced into position B of gas-discharge tube 62 as compared with the case where the additional gas is introduced into position C of gas-discharge tube 61.

When the slow leak is performed at position C, a viscous gas-discharge flow is formed in gas-discharge tube 61 that connects first chamber 21 and roughing vacuum pump 30. When the hydrogen gas discharged from turbomolecular pump 40 flows to roughing vacuum pump 30, the hydrogen gas is blown back by the viscous gas-discharge flow at position A at which gas-discharge tube 61 and gas-discharge tube 62 intersect, thus resulting in stagnation in the gas-discharge flow of the hydrogen gas. Therefore, at position C, the discharge gas compressed by turbomolecular pump 40 is not efficiently discharged.

On the other hand, when the slow leak is performed at position B, a viscous gas-discharge flow is formed in gas-discharge tube 62 that connects turbomolecular pump 40 and position A. Since position B is a position close to the gas-discharge side of turbomolecular pump 40, the hydrogen gas remaining on the gas-discharge side can be blown away at position B. When the hydrogen gas blown away passes through position A at which gas-discharge tube 61 and gas-discharge tube 62 intersect, the hydrogen gas flows to roughing vacuum pump 3 without flowing against the gas-discharge flow from first chamber 21 to roughing vacuum pump 3. Therefore, with the slow leak from position B, the hydrogen gas flows efficiently to the roughing vacuum pump 30 side without causing stagnation in the flow of the hydrogen gas and remaining of the discharge gas compressed by turbomolecular pump 40. Thus, mass spectrometer 1 can attain improved gas-discharge performance for hydrogen gas.

It should be noted that when the oil-sealed rotary pump is used as roughing vacuum pump 30, such a phenomenon that oil is reversely diffused to enter the gas-discharge tube from roughing vacuum pump 30 is prevented by the slow leak in mass spectrometer 1A in which the slow leak is performed at position C. Further, vibration may be generated by an operation of a rotary portion in roughing vacuum pump 30 under application of no load. Mass spectrometer 1A can suppress the operation of the rotary portion by applying a load to roughing vacuum pump 30 by the slow leak, thereby preventing noise resulting from the vibration. These effects are similarly obtained in mass spectrometer 1 in which the slow leak is performed at position B.

The amount of the introduced additional gas is preferably in the range of 0.5 sccm to 0.05 slm ($=0.05\times10^3$ sccm). When the amount of the introduced additional gas is too large, the back pressure of turbomolecular pump 40 becomes high, thus resulting in a low compression ratio of turbomolecular pump 40. This leads to a decreased degree of vacuum in a high vacuum region of third chamber 23. On the other hand, when the amount of the introduced additional gas is too small, the effect of suppressing such a phenomenon that oil enters the gas-discharge tube from roughing vacuum pump 30 is reduced. By setting the amount of the introduced additional gas to fall within the above-described range, it is possible to prevent decrease of the degree of vacuum in the high vacuum region of third chamber 23 and prevent such a phenomenon that oil enters the gas-discharge tube from the roughing vacuum pump.

As shown in FIG. 4, when the slow leak is performed from position C with the plasma being activated, the degree of vacuum is deteriorated from $8.50\times10^{-4}$ [Pa] to $1.10\times10^{-3}$ [Pa]. The back pressure of turbomolecular pump 40 on this occasion is 139 [Pa]. On the other hand, as shown in FIG. 4, in the case where the slow leak is performed from position B with the plasma being activated, when the amount of the introduced additional gas is large, the state with a higher degree of vacuum than that in the case where the slow leak is performed from position C is maintained. The back pressure of turbomolecular pump 40 on this occasion is 160 [Pa]. Further, in the case where the slow leak is performed from position B with the plasma being activated, when the amount of the introduced additional gas is an appropriate amount, the state with a higher degree of vacuum than that in the case where the amount of the introduced additional gas is large is maintained. The back pressure of turbomolecular pump 40 on this occasion is 141 [Pa].

Thus, when the slow leak is performed at position C with the plasma being activated, the degree of vacuum is deteriorated as compared with a case where the slow leak is performed from position B. On the other hand, when the slow leak is performed at position B, the viscous gas-discharge flow is formed in gas-discharge tube 62 that connects turbomolecular pump 40 and position A. Since position B is a position close to the gas-discharge side of turbomolecular pump 40, the hydrogen gas remaining on the gas-discharge side can be blown away at position B. When the hydrogen gas blown away passes through position A at which gas-discharge tube 61 and gas-discharge tube 62 intersect, the hydrogen gas flows to roughing vacuum pump 3 without flowing against the gas-discharge flow from first chamber 21 to roughing vacuum pump 3. Therefore, no stagnation occurs in the flow of the hydrogen gas by the slow leak from position B, and the discharge gas compressed by turbomolecular pump 40 flows efficiently to the roughing vacuum pump 30 side without remaining therein. Thus, mass spectrometer 1 can attain improved gas-discharge performance for hydrogen gas.

When the flow rate of the additional gas is large, the back pressure of turbomolecular pump 40 becomes higher than that when the flow rate of the additional gas is an appropriate amount, thus resulting in a low compression ratio of turbomolecular pump 40. Therefore, the degree of vacuum in the high vacuum region of third chamber 23 is decreased. In mass spectrometer 1, since the back pressure of turbomolecular pump 40 is suppressed by introducing an appropriate amount of the additional gas from position B with the plasma being activated, an excellent compression ratio of turbomolecular pump 40 can be realized. Thus, mass spectrometer 1 can attain improved gas-discharge performance for hydrogen gas.

Mass spectrometer 1 can attain improved gas-discharge performance for hydrogen gas by slowly leaking the additional gas at the optimal introduction position when the plasma is deactivated and when the plasma is activated. This is more effective and economical than in the case where roughing vacuum pump 30 is replaced with a pump having high gas-discharge performance such as a dry pump.

Second Embodiment

Figure 5:
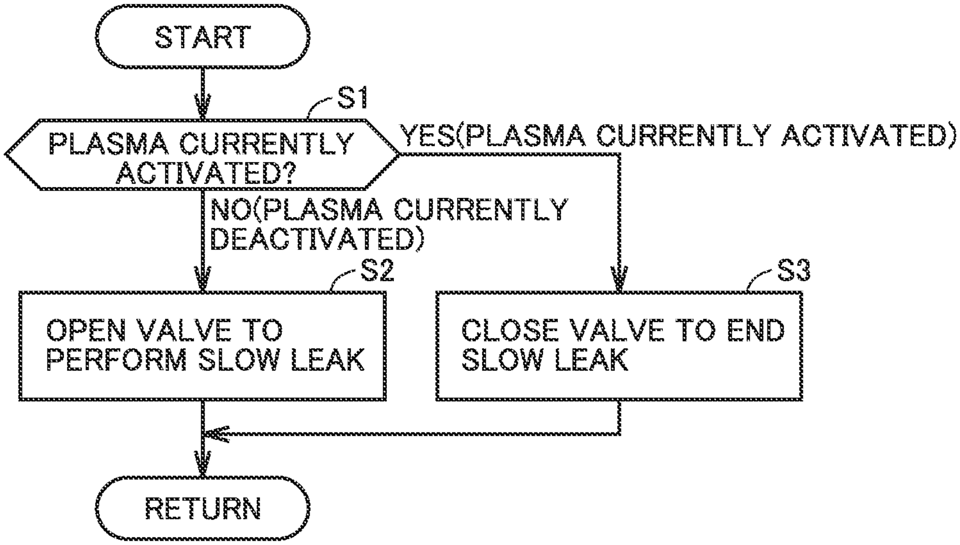
FIG. 5 is a flowchart showing a process performed by a controller in a mass spectrometer according to a second embodiment.

In a second embodiment, the following describes a configuration using an electronic control valve that can control a flow rate instead of valve 50. FIG. 5 is a flowchart showing a process performed by controller 10 in the mass spectrometer according to the second embodiment.

Controller 10 first determines whether or not the plasma is currently activated based on an operational state of plasma torch 15 (step S1). When it is determined that the plasma is currently deactivated (NO in step S1), controller 10 opens the electronic control valve to perform the slow leak (step S2). Then, controller 10 returns the process to a main routine. On the other hand, when it is determined that the plasma is currently activated (YES in step S1), controller 10 closes the electronic control valve to end the slow leak (step S3). Then, controller 10 returns the process to the main routine.

In this way, since controller 10 opens the electronic control valve to perform the slow leak when the plasma is deactivated, it is possible to prevent such a phenomenon that oil enters the gas-discharge tube from roughing vacuum pump 30 and prevent noise of roughing vacuum pump 30 under application of no load. On the other hand, when the plasma is activated, such a phenomenon that oil enters the gas-discharge tube from roughing vacuum pump 30 as well as the noise can be prevented to some extent due to the introduction of plasma gas from sampling cone 71, so that the slow leak can be ended.

Third Embodiment

Figure 6:
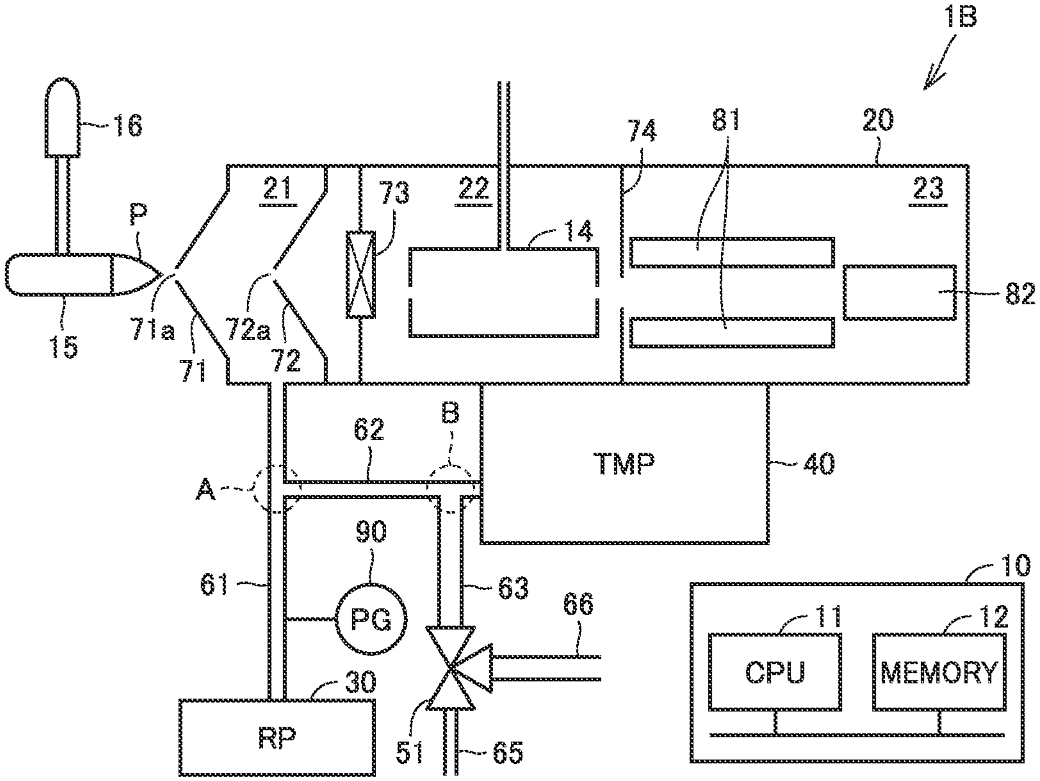
FIG. 6 is a diagram showing a schematic configuration of a mass spectrometer according to a third embodiment.

In a third embodiment, the following describes a configuration in which valve 50 is replaced with three-way valve 51. FIG. 6 is a diagram showing a schematic configuration of a mass spectrometer 1B according to the third embodiment. Mass spectrometer 1B of FIG. 6 has such a configuration that valve 50 of mass spectrometer 1 of FIG. 1 is replaced with a three-way valve 51, and the other configurations are the same. Hereinafter, in mass spectrometer 1B, the same configurations as those in mass spectrometer 1 of FIG. 1 are denoted by the same reference characters and will not be described repeatedly in detail.

As shown in FIG. 6, three-way valve 51 can switch a flow path to be connected to gas-suction tube 63, between first gas-suction tube 65 and a second gas-suction tube 66. The additional gas flows from a gas source (not shown), passes through first gas-suction tube 65 or second gas-suction tube 66, passes through three-way valve 51, then passes through gas-suction tube 63, and is introduced into gas-discharge tube 62. Here, the inner diameter of first gas-suction tube 65 is smaller than that of second gas-suction tube 66. Therefore, the amount of the additional gas introduced from first gas-suction tube 65 to gas-suction tube 63 is smaller than the amount of the additional gas introduced from second gas-suction tube 66 to gas-suction tube 63.

Figure 7:
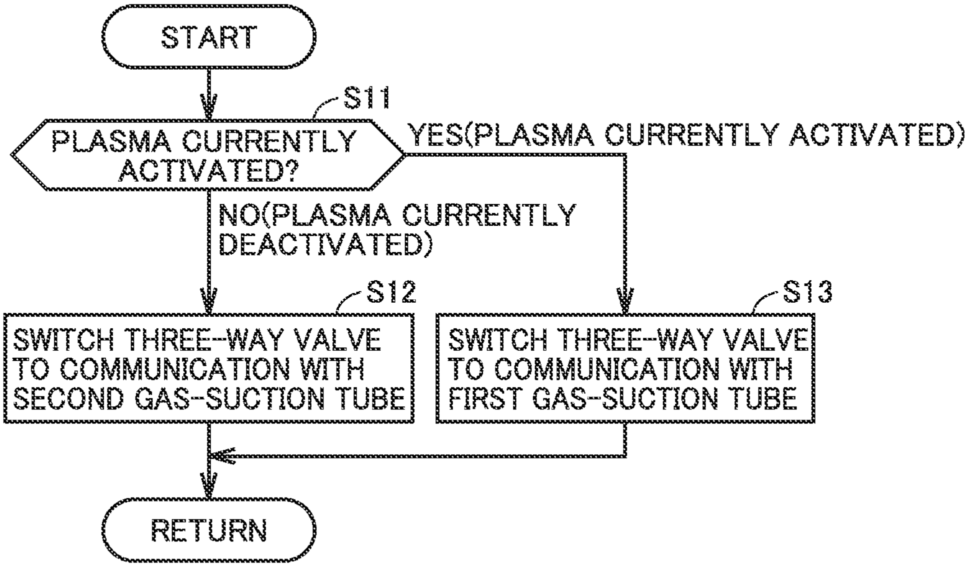
FIG. 7 is a flowchart showing a process performed by a controller in the mass spectrometer according to the third embodiment.

FIG. 7 is a flowchart showing a process performed by controller 10 in mass spectrometer 1B according to the third embodiment.

Controller 10 first determines whether or not the plasma is currently activated based on the operational state of plasma torch 15 (step S11). When it is determined that the plasma is currently deactivated (NO in step S11), controller 10 controls three-way valve 51 to make switching such that second gas-suction tube 66 communicates with gas-suction tube 63 (step S12). Then, controller 10 returns the process to the main routine. Thus, the amount of the additional gas introduced into gas-suction tube 63 is increased.

When it is determined that the plasma is currently activated (YES in step S11), controller 10 controls three-way valve 51 to make switching such that first gas-suction tube 65 communicates with gas-suction tube 63 (step S13). Then, controller 10 returns the process to the main routine. Thus, the amount of the additional gas introduced into gas-suction tube 63 is reduced.

Thus, when the plasma is deactivated, the amount of the additional gas introduced into gas-suction tube 63 is increased to increase the load of roughing vacuum pump 30, with the result that such a phenomenon that oil enters the gas-discharge tube from roughing vacuum pump 30 can be prevented by the pressure of the additional gas. Further, since the additional gas is increased when the plasma is deactivated, a load is applied to roughing vacuum pump 30 in which noise is generated due to vibration or the like under application of no load, thereby preventing the noise. On the other hand, since the flow rate of the additional gas is reduced when the plasma is activated, the back pressure of turbomolecular pump 40 becomes low. Thus, the compression ratio of turbomolecular pump 40 can be improved, thereby improving the degree of vacuum in the high vacuum region of third chamber 23.

Implementations

It will be appreciated by those skilled in the art that the above-described plurality of exemplary embodiments are specific examples of the following implementations.

(Item 1) A mass spectrometer according to one implementation performs mass spectrometry by activating a plasma to ionize a sample. The mass spectrometer includes: a roughing vacuum pump; a turbomolecular pump; a first chamber from which a gas is discharged by the roughing vacuum pump; a second chamber into which a hydrogen gas is introduced, the second chamber being located at a stage subsequent to the first chamber; a third chamber provided with a mass spectrometry unit, the third chamber being located at a stage subsequent to the second chamber, a first flow path that forms a gas-discharge flow from the first chamber to the roughing vacuum pump; and a second flow path that forms a gas-discharge flow from each of the second chamber and the third chamber to the first flow path by the turbomolecular pump. The mass spectrometer introduces, into the second flow path, an additional gas having a molecular weight larger than a molecular weight of the hydrogen gas.

According to the mass spectrometer according to item 1, since the additional gas having a molecular weight larger than that of the hydrogen gas is introduced into the second flow path, a viscous gas-discharge flow can be formed in the second flow path even when a large amount of the hydrogen gas is introduced. Therefore, in mass spectrometer 1, the discharge gas compressed by the turbomolecular pump flows efficiently to the roughing vacuum pump side without remaining therein. Thus, mass spectrometer 1 can attain improved gas-discharge performance for hydrogen gas.

(Item 2) The mass spectrometer further includes a valve that adjusts a flow rate of the additional gas to be introduced into the second flow path. A degree of opening of the valve is set to be smaller than a maximum degree of opening when the plasma is activated and when the plasma is deactivated.

According to the mass spectrometer according to item 2, the gas-discharge performance for hydrogen gas can be improved by slowly leaking the additional gas at the optimal introduction position when the plasma is deactivated and when the plasma is activated.

(Item 3) The mass spectrometer further includes a valve that adjusts a flow rate of the additional gas to be introduced into the second flow path. The valve is brought into a closed state when the plasma is activated, and is brought into an opened state when the plasma is deactivated.

According to the mass spectrometer according to item 3, since the slow leak is performed by opening the valve when the plasma is deactivated, it is possible to prevent such a phenomenon that oil enters the gas-discharge tube from the roughing vacuum pump and prevent noise of the roughing vacuum pump under application of no load. On the other hand, when the plasma is activated, such a phenomenon that oil enters the gas-discharge tube from the roughing vacuum pump as well as the noise can be prevented to some extent due to the introduction of plasma gas, so that the slow leak can be ended.

(Item 4) The mass spectrometer further includes a valve that adjusts a flow rate of the additional gas to be introduced into the second flow path. The flow rate of the additional gas to be introduced by the valve when the plasma is activated is smaller than the flow rate of the additional gas to be introduced by the valve when the plasma is deactivated.

According to the mass spectrometer according to item 4, since the additional gas is increased when the plasma is deactivated, such a phenomenon that oil enters the gas-discharge tube from the roughing vacuum pump can be prevented by the pressure of the additional gas. Further, since the additional gas is increased when the plasma is deactivated, a load is applied to the roughing vacuum pump in which noise is generated due to vibration or the like under application of no load, thereby preventing the noise. On the other hand, since the flow rate of the additional gas is reduced when the plasma is activated, the back pressure of the turbomolecular pump becomes low. Thus, the degree of vacuum in the high vacuum region of the third chamber can be improved by improving the compression ratio of the turbomolecular pump.

(Item 5) The flow rate of the additional gas to be introduced into the second flow path when the plasma is activated is in a range of 0.5 sccm to 0.05 slm.

When the amount of the introduced additional gas is too large, the back pressure of the turbomolecular pump becomes high and the compression ratio of the turbomolecular pump becomes low. This leads to a decreased degree of vacuum in the high vacuum region of the third chamber. On the other hand, when the amount of the introduced additional gas is too small, the effect of suppressing such a phenomenon that oil enters the gas-discharge tube from the roughing vacuum pump is reduced. According to the mass spectrometer according to item 5, it is possible to prevent a decrease in the degree of vacuum in the high vacuum region of the third chamber, and to prevent such a phenomenon that oil enters the gas-discharge tube from the roughing vacuum pump.

(Item 6) The additional gas is any one or a mixed gas of at least two of a gas having an atmospheric component, a nitrogen gas, an argon gas, and a helium gas.

According to the mass spectrometer according to item 6, various gases can be used as the additional gas.

The embodiments disclosed herein are illustrative and non-restrictive in any respect. The scope of the present disclosure is defined by the terms of the claims, rather than the embodiments described above, and is intended to include any modifications within the scope and meaning equivalent to the terms of the claims.

REFERENCE SIGNS LIST

1, 1A, 1B: mass spectrometer; 10: controller; 11: CPU; 12: memory; 14: cell; 15: plasma torch; 16: gas-supply source; 20: main body; 21: first chamber; 22: second chamber; 23: third chamber; 30: roughing vacuum pump; 40: turbomolecular pump; 50: valve; 51: three-way valve; 61, 62: gas-discharge tube; 63, 64, 67, 68: gas-suction tube; 65: first gas-suction tube; 66: second gas-suction tube; 71: sampling cone; 71*a*, 72*a*: orifice; 72: skimmer cone; 73: gate valve; 74: partition wall; 81: multipole electrode; 82: detector; 90: vacuum gauge; P: plasma.

The invention claimed is:

1. A mass spectrometer that performs mass spectrometry by activating a plasma to ionize a sample, the mass spectrometer comprising:

a roughing vacuum pump;

a turbomolecular pump;

a first chamber from which a gas is discharged by the roughing vacuum pump;

a second chamber into which a hydrogen gas is introduced, the second chamber being located at a stage subsequent to the first chamber;

a third chamber provided with a mass spectrometry unit, the third chamber being located at a stage subsequent to the second chamber;

a first flow path that forms a gas-discharge flow from the first chamber to the roughing vacuum pump; and a second flow path that forms a gas-discharge flow from each of the second chamber and the third chamber to the first flow path by the turbomolecular pump, wherein the mass spectrometer introduces, into the second flow path, an additional gas having a molecular weight larger than a molecular weight of the hydrogen gas, the mass spectrometer further comprising a valve that adjusts a flow rate of the additional gas to be introduced into the second flow path, and the valve is brought into a closed state when the plasma is activated, and is brought into an opened state when the plasma is deactivated.

2. The mass spectrometer according to claim 1, wherein the flow rate of the additional gas to be introduced by the valve when the plasma is activated is smaller than the flow rate of the additional gas to be introduced by the valve when the plasma is deactivated.

3. The mass spectrometer according to claim 2, wherein the flow rate of the additional gas to be introduced into the second flow path when the plasma is activated is in a range of 0.5 sccm to 0.05 slm.

4. The mass spectrometer according to claim 1, wherein the additional gas is any one or a mixed gas of at least two of a gas having an atmospheric component, a nitrogen gas, an argon gas, and a helium gas.

* * * * *